Figure 3:
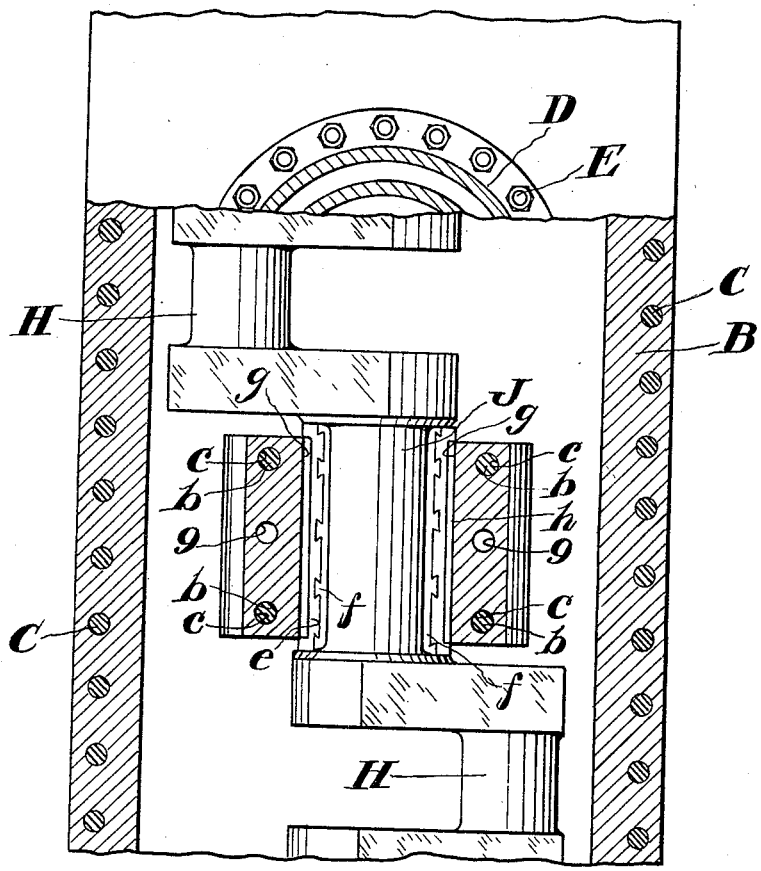

May 23, 1933.
R. MILLER
1,909,977
BEARING
Filed July 16, 1931
2 Sheets-Sheet 1
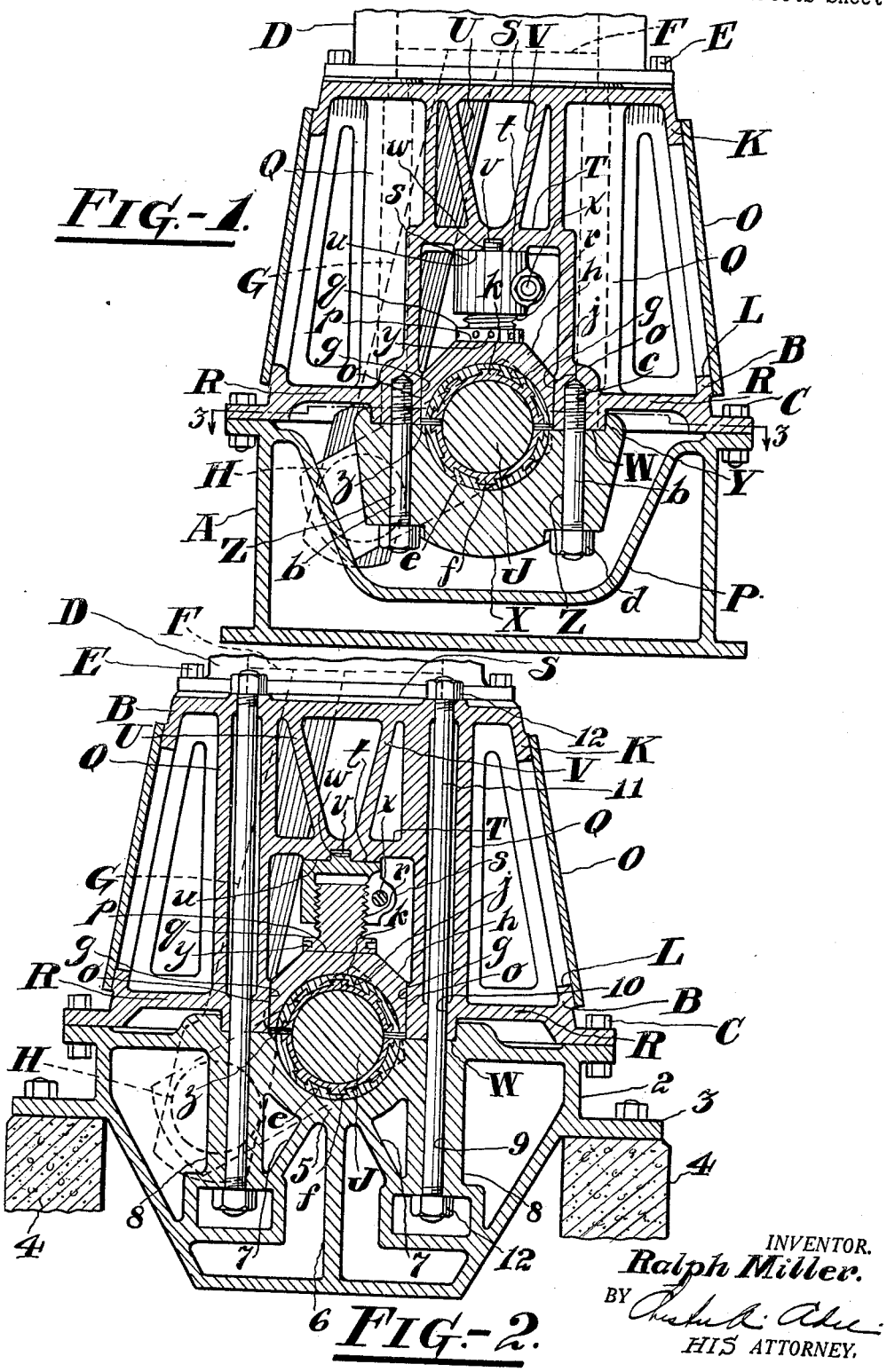
INVENTOR.
Ralph Miller.
BY
HIS ATTORNEY.

Patented May 23, 1933

1,909,977

UNITED STATES PATENT OFFICE

RALPH MILLER, OF EASTON, PENNSYLVANIA, ASSIGNOR TO INGERSOLL-RAND COMPANY, OF JERSEY CITY, NEW JERSEY, A CORPORATION OF NEW JERSEY

BEARING

Application filed July 16, 1931. Serial No. 551,145.

This invention relates to bearings, but more particularly to bearings for crank shafts of engines, compressors, and the like.

One object of the invention is to facilitate the operation of effecting adjustment between the several members of the bearing.

Other objects are to maintain the bearing cap firmly in the correct assembled position by clamping pressure applied radially thereto and to avoid distortion of the bearing cap.

Other objects will be in part obvious and in part pointed out hereinafter.

In the drawings illustrating the invention and in which similar reference characters refer to similar parts, Figure 1 is an elevation in section of a bearing construction having the invention applied thereto, Figure 2 is a view similar to Figure 1 illustrating a modified form of bearing, and Figure 3 is a transverse view taken through Figure 1 on the line 3—3 looking in the direction indicated by the arrows.

Referring to the drawings and at first more particularly to Figures 1 and 3, A designates a bed plate and B a frame supported by the bed plate A and secured thereto by bolts C. The frame B in turn supports the cylinder or cylinders D of an engine which may be secured to the frame by bolts E.

Disposed within the cylinder D is a piston F having the usual connecting rod G which is connected with its opposite end to the pin H of a crank shaft J.

The frame B constructed in accordance with the practice of the invention has outer walls K wherein are openings L through which access may be had to the interior of the frame B. Covers O, which may be secured to the walls K in any suitable manner, form closures for the openings L to prevent the entrance of foreign matters into the frame B and the bed plate and, more particularly, into a crank case P which may be an integral portion of the bed plate.

On the opposite sides of the longitudinal median line of the frame B are columns or brace members Q which are connected at their lower ends with the corresponding ends of the wall K by lateral walls R and are joined at their upper ends to a wall S which forms the uppermost extremity of the frame B and serves to connect the walls K at that end. Intermediate the ends of the braces Q is a transverse wall T which connects the braces and the intermediate portion of said wall is connected to the wall S by a pair of walls U and V which diverge from an intermediate portion of the wall T and are joined to the wall S at points preferably closely adjacent the upper ends of the braces Q.

Seated against the lowermost ends W of the braces Q, and which ends extend slightly below the walls R, is a bridge X having lugs Y to engage the outer surfaces of the projecting ends of the braces for preventing relative lateral movement between the bearing member and the frame. In the bridge X are apertures Z for the accommodation of bolts $b$ which are threaded into threaded apertures $c$ in the bottom surface of the braces Q and have nuts $d$ to seat against the bridge X for clamping said bridge securely against the lower ends of the braces Q.

In the bridge X is a semi-circular recess $e$ to accommodate a bearing shell $f$ whereby the shaft J is supported.

Closely adjacent the recess $e$ and on the inner surfaces of the braces Q are surfaces $g$ which are spaced equi-distantly from the longitudinal axis of the recess $e$ and serve to guide a bearing cap $h$ in a vertical plane to assure the correct assembled position thereof with respect to the shaft J, the bearing cap $h$ being of course provided with a recess $j$ similar to the recess $e$ wherewith it cooperates to form a bearing for the shaft J and may, as is customary, be provided with the usual bearing metal $k$.

On the opposite sides of the bearing cap $h$ are surfaces $o$ which seat against the surfaces $g$ and on the top of the bearing cap $h$ is a flat surface $p$ which is perpendicular to the surfaces $o$ and affords a seat for a head $q$ of a screw $r$. A threaded sleeve or cap nut $s$ is threaded on the screw $r$ and seats with its upper end $t$ against a surface $u$ on the wall T.

The nut $s$ is provided on its upper end with a cylindrical projection $v$ which extends into a recess $w$ in the wall T to centralize the screw $r$ and the nut $s$ with respect to the shaft J. In other words, the projection $v$ serves to maintain the screw and the nut prependicular to the longitudinal axis of the shaft J. Preferably the nut $s$ is split or provided with a slot in one side and is also provided with a bolt $x$ to enable the nut to be clamped fixedly on the screw $r$ to assure against relative movement between the nut and the screw.

The head $q$ of the screw $r$ is preferably provided with recesses, as for instance cylindrical apertures $y$, for the reception of an implement whereby the screw $r$ may be rotated relatively to the nut $s$ and the bearing cap $h$.

Shims $z$ are interposed between the cap $h$ and the shell $f$ to assure the correct clearance between the shaft and the elements which serve as a bearing therefor.

In the modified form of the invention illustrated in Figure 2, the frame B is shown supported by a base plate 2 having lateral lugs 3 seated upon foundations 4 as is customary in marine installations. The base plate 2, which also serves as a crank case, has an integral bearing member 5 which is suitably recessed to accommodate the shell $f$. The bearing member 5 is reinforced by a central wall or rib 6 extending therefrom to the bottom of the base plate and also by diagonal walls 7 which diverge from the central rib and join at their lowermost ends with posts or braces 8 which, in the assembled position of the bearing, lie in the same vertical plane as the braces Q.

In the posts 8 are apertures 9 which register with apertures 10 in the braces Q to accommodate bolts 11 of the stud type having nuts 12 threaded on opposite ends to seat against the bottom surfaces of the posts 8 and upon the wall S. The apertures 10 in the frame B are located in the braces Q substantially midway between the threaded apertures $c$ so that the frame B may be used either in connection with installations requiring through-bolts for securing the frame to the base plate or in installations wherein it is desirable to seat the base plate directly upon the floor and employ a bridge such as that designated X in Figure 1 to support the shaft.

The operation of the device is as follows: Whenever it is desired to effect an adjustment between the bearing member and the bearing cap or to remove a shell for inspection or replacement it is merely necessary to remove the clamping pressure on the nut $s$. The screw $r$ may then be threaded into the nut and the nut and screw may be removed from the frame. The bearing cap $h$ may then be removed to admit of access to the shims or to the shell $f$. After the necessary adjustments, inspections or replacements have been made the cap $h$ may be seated in the correct assembled position. The screw $r$, together with the nut $s$ may then again be placed in position and tightened to exert the required clamping effect upon the bearing cap $h$.

As will be readily observed, due to the present invention any clamping pressure which will be applied to the bearing cap $h$ will act radially thereof instead of on the outer extremity of the cap as is customary. Moreover, upon the application of pressure to the cap for clamping it to the bearing member the shape of the cap will remain unchanged as the braces Q against which the surfaces O of the bearing cap seat will prevent distortion of the cap in a lateral direction.

I claim:

1. A shaft bearing comprising a supporting frame, a bearing member seating against the frame and having means to interlock with the frame, bolts for securing the bearing member to the frame, a bearing cap slidable in the frame, guide surfaces on the frame to guide the bearing cap, and a clamping device seated upon the cap and acting against the frame to clamp the bearing cap in assembled relationship with the bearing member.

2. A shaft bearing comprising a frame, a bearing member seating against and being suspended from the frame, interlocking portions on the frame and the bearing member to prevent relative lateral movement between the frame and the bearing member, bolts for securing the bearing member to the frame, a bearing cap slidable in the frame, guide surfaces on the frame to guide the bearing cap, clamping means including a screw and a slotted nut and being interposed between the frame and the cap to secure said cap in the correct assembled relationship with respect to the bearing member, and clamping means on the nut to lock said nut to the screw.

3. A shaft bearing comprising a frame, a bearing member seating against and being suspended from the frame, lugs on the bearing member interlockingly engaging the frame, bolts for securing the bearing member to the frame, a bearing cap slidable in the frame, guide surfaces on the frame to guide the bearing cap, clamping means including a screw and a nut and being interposed between the frame and the cap to secure said cap in the correct assembled relationship with respect to the bearing member, and means for clamping the nut securely to the screw.

4. A shaft bearing comprising a frame, a bearing member seating against the frame and having a semi-cylindrical recess, lugs on the bearing member interlockingly engaging the frame, a shell in the recess, braces integral with the frame and being arranged closely adjacent the sides of the recess, a bearing cap to seat upon the bearing member, guide surfaces on the braces to guide the bearing cap, clamping means comprising a screw and a nut and being interposed between the frame and the cap to secure said cap in the correct assembled relationship with respect to the bearing member, apertures in the bearing member and the braces, and bolts in the apertures for securing the bearing member to the frame.

In testimony whereof I have signed this specification.

RALPH MILLER.